US006874691B1

(12) United States Patent
Hildebrand et al.

(10) Patent No.: US 6,874,691 B1
(45) Date of Patent: Apr. 5, 2005

(54) SYSTEM AND METHOD FOR ENERGY MANAGEMENT

(75) Inventors: Paul N. Hildebrand, Tulsa, OK (US); Philip L. Parsons, Broken Arrow, OK (US)

(73) Assignee: Excel Energy Technologies, Inc., Tulsa, OK (US)

( * ) Notice: Subject to any disclaimer, the term of this patent is extended or adjusted under 35 U.S.C. 154(b) by 0 days.

(21) Appl. No.: 10/119,647

(22) Filed: Apr. 10, 2002

Related U.S. Application Data

(60) Provisional application No. 60/282,700, filed on Apr. 10, 2001.

(51) Int. Cl.[7] ............................................. G05D 23/00
(52) U.S. Cl. ......................... 236/51; 379/102.5; 62/126
(58) Field of Search .............................. 236/51; 62/126, 62/129; 379/102.05, 102.02, 102.03; 340/870.02, 870.03

(56) References Cited

U.S. PATENT DOCUMENTS

| | | | | |
|---|---|---|---|---|
| 5,565,855 A | * | 10/1996 | Knibbe | 340/825.06 |
| 5,761,083 A | * | 6/1998 | Brown, Jr. et al. | 364/492 |
| 5,875,430 A | * | 2/1999 | Koether | 705/1 |
| 6,256,378 B1 | * | 7/2001 | Iggulden et al. | 379/102.03 |
| 6,275,166 B1 | * | 8/2001 | del Castillo et al. | 340/825.07 |
| 6,415,023 B2 | * | 7/2002 | Iggulden | 379/102.03 |
| 6,483,906 B1 | * | 11/2002 | Iggulden et al. | 379/102.03 |
| 6,502,411 B2 | * | 1/2003 | Okamoto | 62/129 |
| 2001/0048030 A1 | * | 12/2001 | Sharood et al. | 236/49.3 |
| 2002/0011923 A1 | * | 1/2002 | Cunningham et al. | 340/310.01 |
| 2002/0077077 A1 | * | 6/2002 | Rezvani et al. | 455/410 |
| 2002/0189267 A1 | * | 12/2002 | Singh et al. | 62/126 |
| 2003/0080113 A1 | * | 5/2003 | Williamson | 219/506 |
| 2003/0109938 A1 | * | 6/2003 | Daum et al. | 700/11 |

* cited by examiner

Primary Examiner—Marc Norman
(74) Attorney, Agent, or Firm—Fellers, Snider, Blankenship, Bailey & Tippens, P.C.

(57) ABSTRACT

A building automation system having: a plurality of wireless remote devices, each wireless remote device including a wireless transceiver for transmitting and receiving digital information and an interface for energy management which can read a sensor, such as a temperature sensor, a flow sensor, an electronically readable gas or electric meter, or provide an output, such as a relay driver; and a controller having a wireless transceiver for digital communication with the wireless remote devices and a computer interface. Each wireless remote device includes an identifier to identify the type of interface present in the remote device and a serial number to allow the controller to communicate exclusively with any individual remote device. The controller interface allows the controller to communicate with a computer, and ultimately with a server to allow monitoring and control of the system from virtually anywhere in the world.

7 Claims, 4 Drawing Sheets

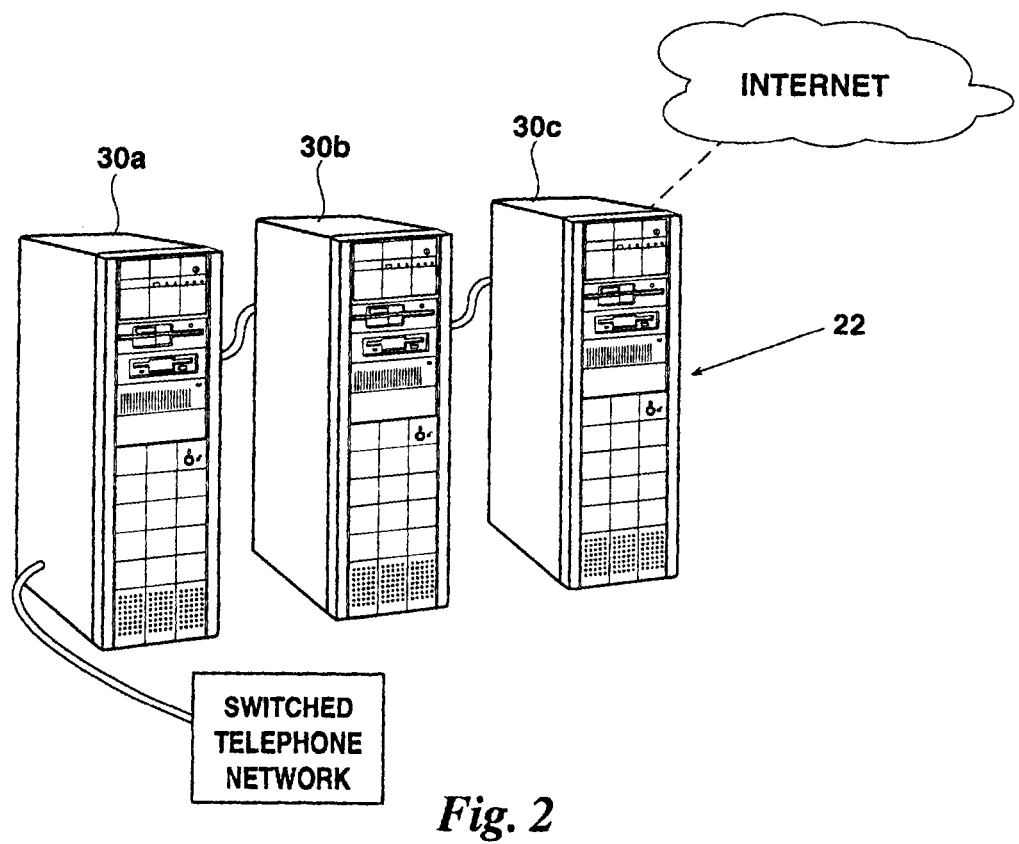
*Fig. 2*
*Fig. 3*
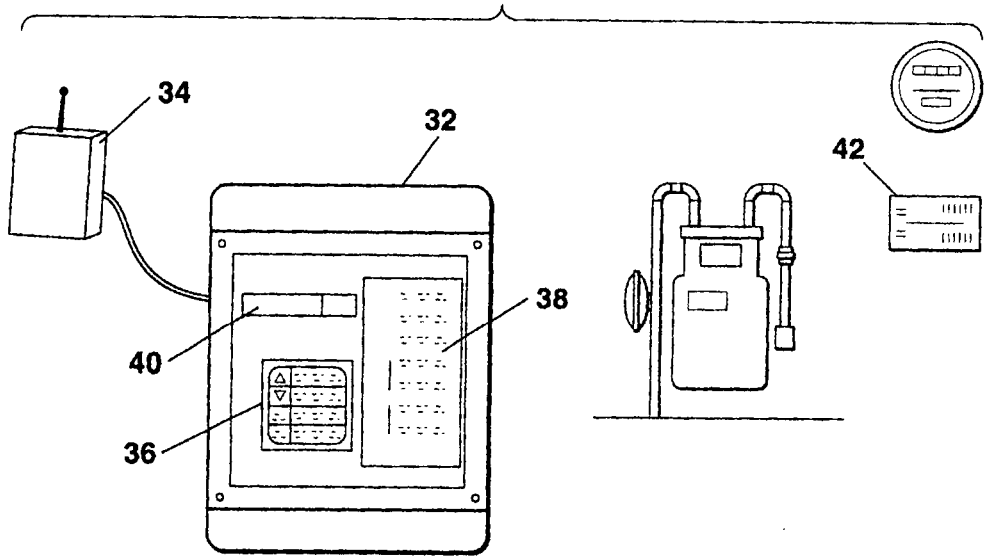

SYSTEM AND METHOD FOR ENERGY MANAGEMENT

CROSS REFERENCE TO RELATED APPLICATIONS

This invention claims benefit of copending U.S. Provisional Application Ser. No. 60/282,700 filed Apr. 10, 2001.

BACKGROUND OF THE INVENTION

1. Field of the Invention

The present invention relates to a system for energy management and a method for using the same. More particularly, but not by way of limitation, the present invention relates to a system which monitors a variety of conditions associated with energy usage in a building to provide management as well as monitoring such energy usage.

2. Background of the Invention

The monitoring and management of energy usage in a building is generally of concern. There are a number of advantages to energy management, especially in large, commercial buildings. Obviously, intelligent management of heating and air conditioning systems can dramatically reduce the energy costs of operating such systems. Beyond that, however, an energy management system may provide an indication of problems in the building, provide meaningful forecasting of energy costs, reduce periodic maintenance, provide accurate usage information to the utility companies, among other things.

A number of existing energy management systems provide such functions. A typical system includes temperature sensors placed about the building for monitoring the indoor air temperature, an outdoor temperature sensor for monitoring the outdoor air temperature, flow meters for measuring natural gas usage, and current or watt meters for measuring electrical consumption. Additional sensors are sometimes included to monitor airflow within HVAC ducts, to measure the temperature of air flowing through such ducts, to monitor chilled water and steam, as well as for measuring other parameters of interest. Typically these systems allow the temperature to be controlled in various areas of a building independent of the other areas of the building and based on information such as the day of the week, time of day, the outside air temperature, whether people are working in an area, etc. In addition, such systems may provide control of other energy consuming devices such as lighting.

Furthermore, many systems also maintain historical records and may report such historical data in the form of graphs or charts. This data may be used to predict future energy usage and to identify anomalies which may be indicative of a need for equipment maintenance or of other problems within the building.

While such systems are presently in use, they suffer from a number of limitations. For example, each individual sensor must be wired to a central controller. Since the sensors are likely dispersed throughout the building, the task of wiring the management system may be daunting, particularly in existing buildings. In addition, while such systems may recognize a problem, the system's ability to provide an alert to indicate the problem is somewhat limited. Furthermore, the ability to display historical or statistical information is typically limited to a single computer connected to the controller.

SUMMARY OF THE INVENTION

The present invention provides a system for energy management within a building and a method for utilizing the system. In one embodiment the system includes: a wireless network whereby various transducers wirelessly provide input to a controller and various output modules wirelessly receive direction from the controller; and a controller including a wireless interface for communicating over the wireless network.

In another embodiment, the system further includes a computer which is attachable to a computer network. The computer gathers and stores information from the controller and/or directly from the transducers. Periodically, the computer sends the gathered information to a server which stores and collects such data from multiple sites. Immediate system information and historical data may be displayed or manipulated at the computer.

In yet another embodiment, the system further includes a remote server which collects energy management information from multiple energy management systems and allows the information from one or more energy managements sites to be accessed via the Internet. Thus, an authorized person can view recent and historic energy management information from a particular system from anywhere in the world where an Internet connection is available. A number of advantages are provided by such a system. For example: an offsite consultant can review historical and present energy usage information to make recommendations; a large number of buildings may be managed from a single location reducing redundant workforce and equipment; the information may be accessed by local utilities to aid in load planning; personnel can access energy management information while away from the facility to troubleshoot problems; etc.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 2 depicts a typical server employed in the inventive system for energy management.

FIG. 3 provides a diagram of a building automation system incorporating a dedicated controller.

DESCRIPTION OF THE PREFERRED EMBODIMENTS

Figure 1:
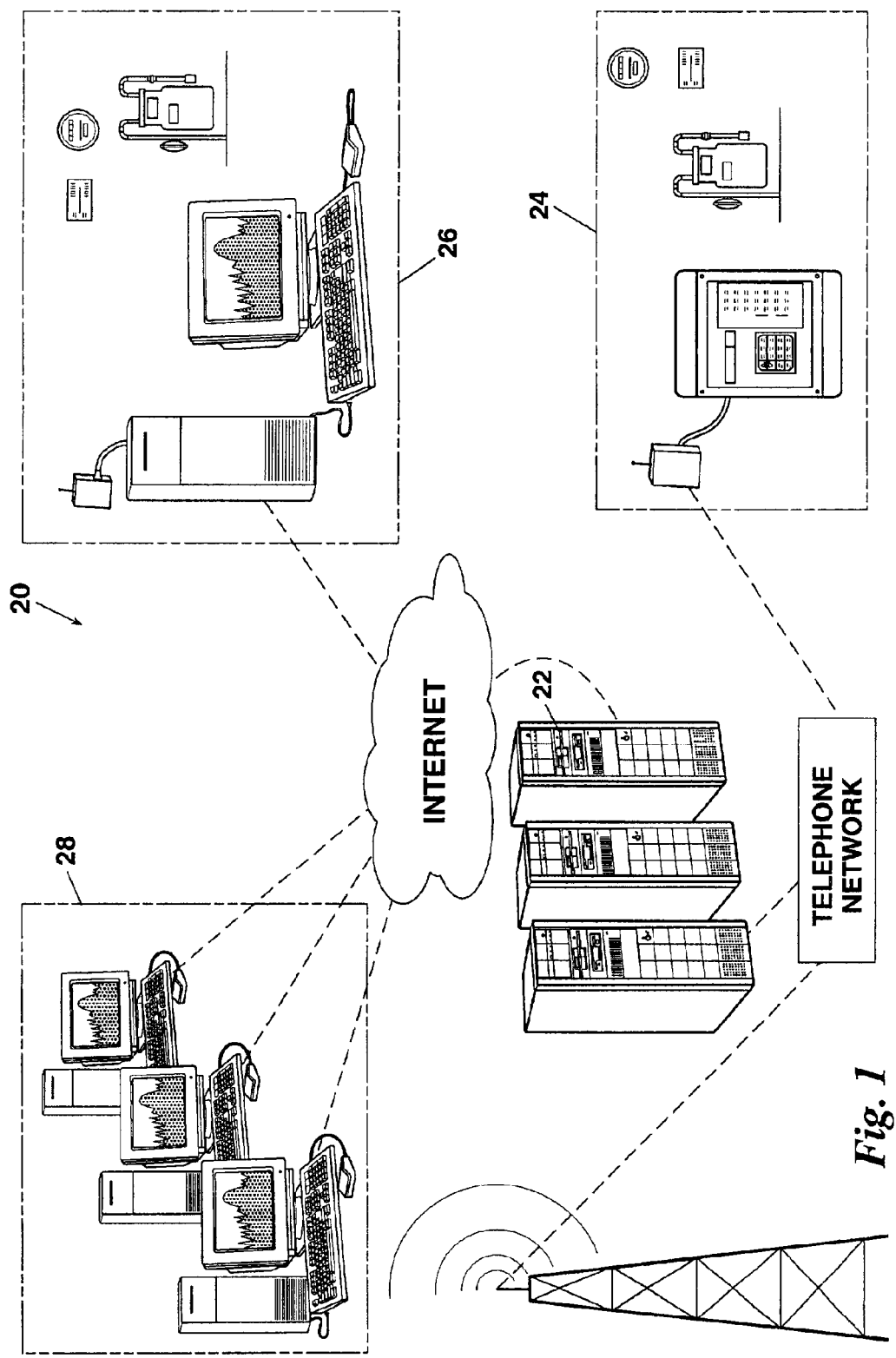
FIG. 1 provides a block diagram depicting the inventive system for energy management.

Depicted in FIG. 1 is a system for energy management 20 comprising: a server 22 for gathering and managing energy usage information from multiple sites; a first building automation system 24 communicating with the server 22 via a conventional telephone line; and a second building system 26 communicating with the server 22 via the Internet. The server Internet connection allows users 28 of the system 20 to remotely access information gathered by the server 22 as well as providing communication with individual building automation systems 26. In addition, the server 22 can monitor the information received from individual building automation systems 24 or 26 and, upon detecting an abnormal condition, access a paging system over a telephone connection to notify the appropriate personnel of a potential problem.

Referring to FIG. 2, server 22 is preferably a group of computers 30a–c which share a common database. In a typical server 22 individual computers 30a–c could be programmed to perform specialized tasks. For example, computer 30a could be responsible for the collection of information from building automation systems received over dial-up telephone lines, while computer 30b could be responsible for the collection of information from building automation systems over the Internet, and computer 30c could process and format the information for delivery to users over the Internet. As will be apparent to those skilled in the art, the server 22 just described would be adequate for a system of moderate size. A small system supporting a relatively small number of building automation systems could easily be incorporated into a single computer while a large system supporting a large number of building automation systems could employee multiple computers for each task with individual computers dispersed over a large geographical area, and themselves connected by the Internet or other computer network. The functions performed by the server are the gathering of information from individual automation systems, storage of the information, processing and formatting of the information into a meaningful form, and delivery of the information to users or subscribers. In addition, the server may monitor the incoming information and, typically after some processing, report abnormal conditions via conventional telephones, cellular telephones, pagers, or the like. This information might indicate a problem with the heating/air conditioning system, a problem with the building's utility systems, or a problem with the building itself which is resulting in abnormal conditions within the building or in unusual energy consumption.

Preferably the information provided over the Internet by the server is in a format recognizable by a conventional web browser. Thus, no special software or hardware is required to access the energy usage information for a given building.

Building automation may be accomplished in a number of different fashions. In one embodiment, as shown in FIG. 3, the building automation system 24 employs a dedicated automation controller 32. Controller 32 provides a variety of interfaces for use with conventional sensors or transducers which are wired directly to the controller 32. Such sensors are commonly used to measure temperature, humidity, natural gas usage, electrical power consumption, etc. In addition, however, the inventive controller 32 also includes a wireless interface 34 to communicate with a variety of wireless sensors or transducers via a wireless network.

Controller 32 may be configured to call a server 22 (FIG. 1) periodically via a conventional dial-up telephone line or communicate with a local computer which in turn communicates with the server 22 via a dial-up line or over the Internet.

Typically a controller 32 will provide a keypad 36 for inputting programming information, indicators 38 which indicate the status of the various systems under the control of the building automation system, and numerical displays 40 for outputting information. Controllers for use with hard-wired sensors are known in the art and allow a control of heating and air conditioning systems, as well as other energy consuming systems, based on the input of various sensors including indoor temperature sensors, humidity sensors, outdoor temperature sensors, etc.

Figure 5:
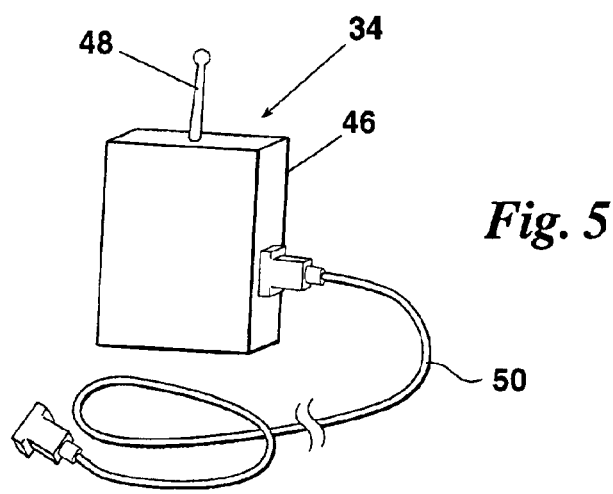
FIG. 5 provides a perspective view of a wireless interface employed in the inventive system.

Referring to FIG. 5, wireless interface 34 preferably includes: radio transceiver 46 configured for bidirectional digital communication over a wireless network; antenna 48 through which radio frequency signals are transmitted and received; and cable 50 which carries information between wireless interface 34 and a controller 32. Preferably the information is transferred between controller 32 and wireless interface 34 using a serial communication scheme such as RS-232, RS-485, or the like.

When wireless interface 34 is used with one or more of the inventive wireless sensors 42 (FIG. 3), information transmitted over the wireless network provides controller 32 with information previously provided by wired sensors as well as allows controller 32 to wirelessly control devices previously wired directly to the controller.

Figure 4:
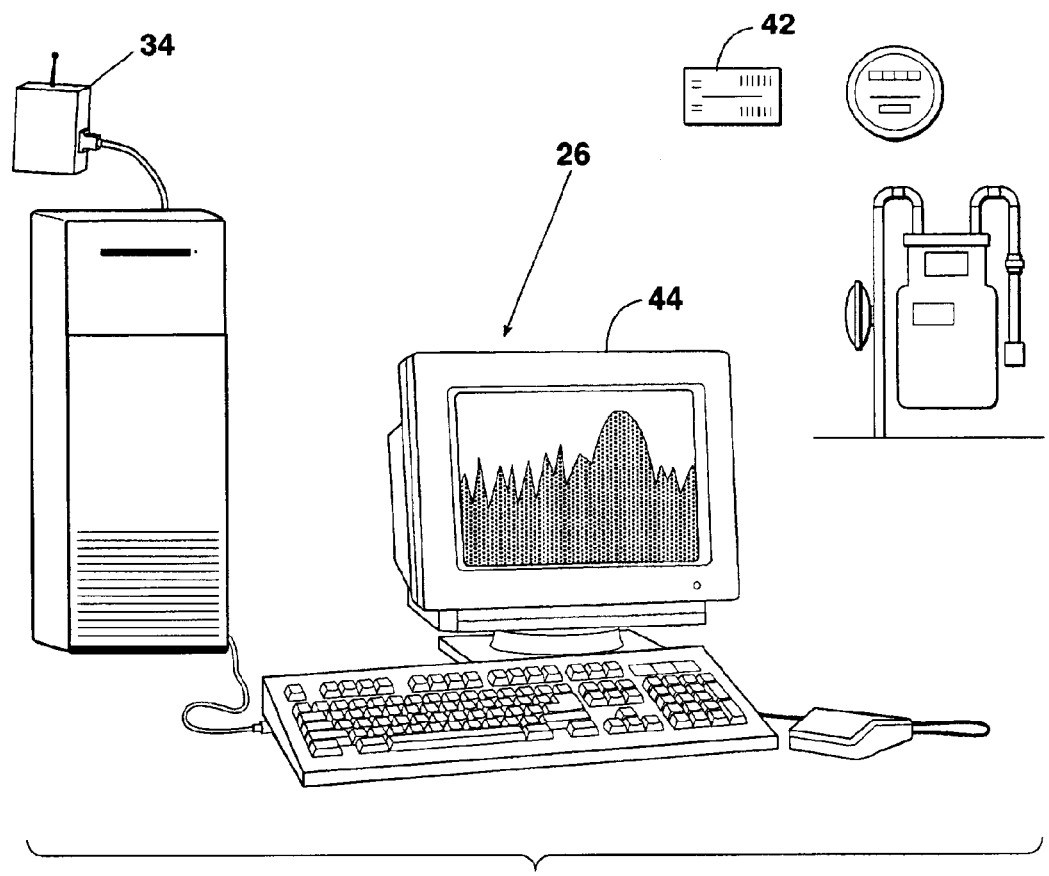
FIG. 4 provides a diagram of an alternate embodiment of a building automation system incorporating a desktop computer.

Referring next to FIG. 4, in an alternative building automation system 26, the functions provided by controller 32 (FIG. 3) are instead provided through a conventional desktop computer 44. By simply adding wireless interface 34 to a conventional desktop computer 44, environmental and usage information become instantly available to the computer 44. Thus, it is a relatively simple matter to configure computer 44 to communicate with wireless sensors over the wireless network. In contrast, prior art sensors would require the desktop computer 44 to be configured with data acquisition hardware capable of interfacing current loop transducers, thermocouples, humidity sensors, pulse counters, etc., a daunting task, at best. With such environmental and energy usage data available to the desktop computer 44, the functions of controller 32 may simply be embodied in software executed by computer 44.

It should be noted that while the term "building automation system" is used herein in its broadest sense, not only to describe a system which provides control of energy consuming systems within a building, but also to encompasses systems which monitor energy usage information and environmental information. Such a monitoring system could employ either a dedicated controller 32 or a desktop computer 44, in communication with transducers and sensors as required to perform the desired monitoring.

Figure 6:
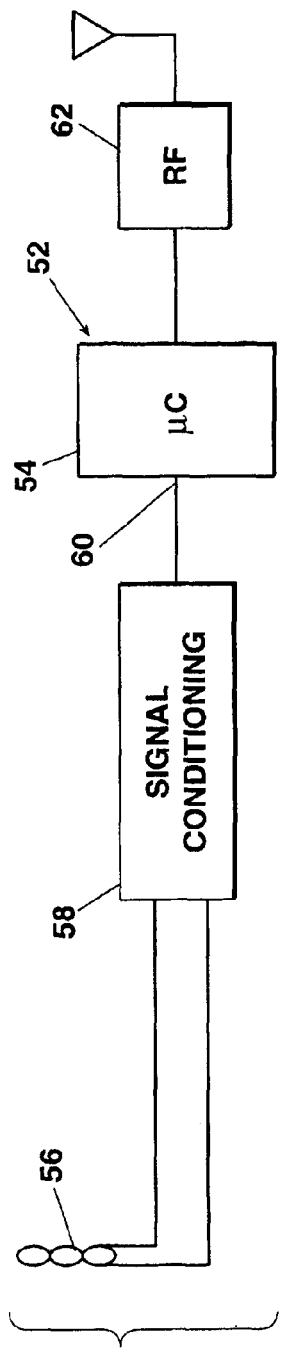
FIG. 6 provides a block diagram of a wireless temperature sensor for use in the inventive system.

Wireless sensors 42 are available for monitoring a variety of environmental conditions as well as monitoring energy usage. Referring to FIG. 6, a wireless temperature sensor 52 comprises: a microcontroller 54 which preferably includes an analog to digital converter having an analog input 60; a thermocouple 56; signal conditioner 58 which receives the signal from thermocouple 56 to process the signal for delivery to analog input 60 of microcontroller 54; and radio frequency transceiver 62 configured for wireless digital communication with wireless interface 34. The microcontroller periodically reads the analog output voltage of the thermocouple, mathematically converts the value of the analog voltage to a value representing the temperature of the thermocouple, either in degrees Celsius or degrees Fahrenheit, and serially transmits the information via wireless transceiver 62.

Other wireless analog sensors (i.e., humidity sensors, airflow sensors, etc.) operate in a similar manner except an appropriate sensing device is substituted for the thermocouple 52 and signal conditioner 58 is adapted to perform appropriate scaling and/or filtering of signal produced by the sensing device.

Figure 7:
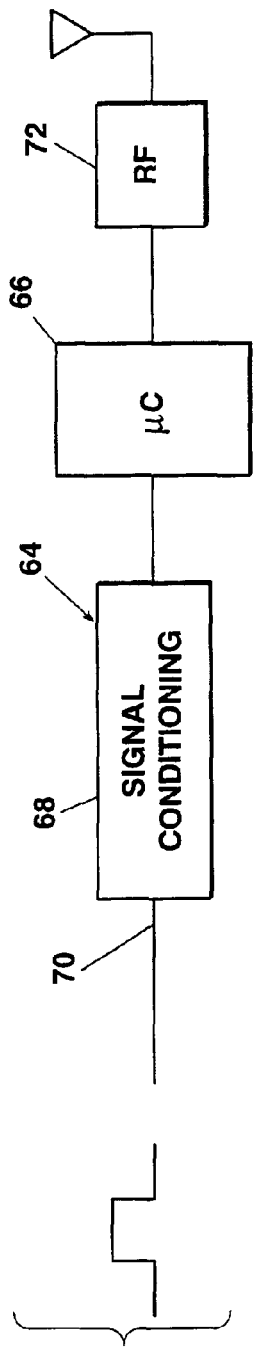
FIG. 7 provides a block diagram of a wireless pulse totalizer for use in the inventive system.

In addition to analog sensors, such as temperature sensor 52, a building automation system will likely include wireless sensors configured to receive a binary signal. Referring to FIG. 7, one such wireless sensor is the pulse totalizer 64. Pulse totalizer 64 receives binary pulses at input 70. After processing by signal conditioner 68, individual pulses are counted by microcontroller 66. Periodically, microcontroller 66 sends the total number of accumulated pulses to wireless transceiver 72 for transmission over the wireless network. As will be apparent to those skilled in the art, many gas meters, electric meters, and flow sensors provide a pulse output to indicate measured usage or measured flow. Thus, by counting the pulses it is possible to determine the energy usage or material flow. It should be noted that the pulse totalizer 64 transmits the total number of pulses received. In this way, if a transmission is not received by controller 32 (FIG. 3) or computer 44 (FIG. 4), the next transmission from the pulse totalizer 64 will correct the missing information. Pulse totalizer 64 can accumulate a sufficiently large number of pulses that, in light of the acceptable input bandwidth, it is virtually impossible to overflow the counter. In the preferred embodiment, a 32-bit counter is employed such that the total number of pulses which may be received without overflowing is in excess of 4.2 billion. At a rate of 300 pulses per minute, the anticipated maximum pulse rate, an overflow would occur about once every 27 years. If however, a pulse accumulator was in service a sufficient number of years to actually reach an overflow, the count would simply return to zero.

Figure 8:
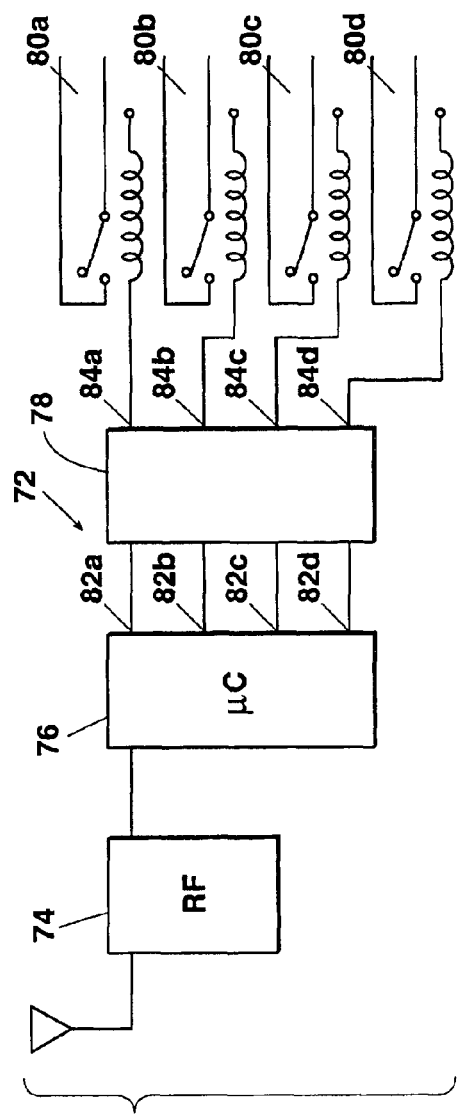
FIG. 8 provides a block diagram of a wireless relay module for use in the inventive system.

In addition to wireless sensors 42 which transmit information to the wireless interface 34 (FIG. 5), a building automation system may include a wireless relay module 72 which receives commands from the wireless interface 34. Referring now to FIG. 8, relay module 72 comprises a radio frequency transceiver 74; a microcontroller 76 having a plurality of outputs 82*a–d*; a relay driver circuit 78 providing a plurality of individual relay driver outputs 84*a–d*; and one or more relays 80*a–d* (four shown). In operation, a building automation controller would send a command wirelessly to relay module 72 directing the operation of relays 80*a–d*. Upon receiving a command, microcontroller 76 individually sets or clears each output 82*a*, 82*b*, 82*c*, and 82*d*. Each output 82*a–d* is connected to the input of a corresponding relay driver in driver circuit 78. The output of each relay driver 84*a–d* is in turn connected to the coil of a corresponding relay 80*a–d* such that, for example, relay 80*a* is energized as output 82*a* is set or relay 80*a* is de-energized as output 82*a* is cleared. Operation of relays 80*b–d* operates in an identical manner. Typically relays 80*a–d* would be used to control the operation of air conditioner compressors, blowers, pumps, heaters, lights, etc.

It should be noted that the sensors employed, whether hard wired or wireless, and whether providing an input, i.e., flow, temperature, etc., or providing an output, i.e., relay drive, are for the management of energy usage within a building. Energy management involves the monitoring or controlling of energy usage, or a related parameter, i.e. room temperature, outdoor temperature, etc., for an energy consuming device. It should also be noted that, as used herein the term "energy consuming device" is used broadly to not only include devices that directly consume energy, i.e., HVAC equipment, lighting, etc., but also to include energy measuring devices, i.e., electric meters, gas meters, etc.

Each type of remote wireless device, i.e. temperature sensor 52, pulse totalizer 64, relay module 72, etc., is provided with a unique identifier and each individual wireless device 42 is provided with a unique serial number. A controller 32 or 44 can communicate with any individual wireless device 42 through wireless interface 34 once the device type and serial numbers are known. Serial communication schemes for communicating with a specific device on a network are well known in the art.

As will be apparent to those skilled in the art, any type of transducer or sensor which provides an electrical output could be adapted for wireless use with the present invention. The information gathered from virtually any type of sensor, whether wireless or otherwise, may be stored locally in an automation controller for periodic or sporadic transmission to a server over a computer network, preferably the Internet. The server may be adapted to collect and process such information for presentation in a variety of formats over the Internet.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. An energy management and monitoring system comprising:
   a plurality of wireless remote devices located at a building, each wireless remote device including:
      a first wireless transceiver configured for the transmission and reception of digital information;
      a first interface for energy management or monitoring;
      an identifier transmittable by said first wireless transceiver which identifies a type of said first interface; and
      a unique serial number transmittable by said first wireless transceiver;
   a controller located at said building, said controller in wireless communication with said plurality of wireless remote devices to monitor environmental conditions at said building and energy usage at said building, said controller being programmable to control conditions within said building based on said environmental conditions and energy usage as monitored by said plurality of wireless remote devices, said controller including:
      a second wireless transceiver configured for digital communication with said first wireless transceiver; and
      a second interface; and
   a server in communication with said controller via said second interface to collect information regarding the environmental conditions at said building, the energy usage at said building, and the control of environmental conditions within said building, said server being in further communication with the internet such that said information can be accessed via a web browser,
   wherein said controller can communicate with an individual remote device by transmitting or receiving the unique serial number of said individual wireless remote device.

2. The energy management and monitoring system of claim 1 wherein said controller further comprises computer in communication with at least one remote wireless devices to manage energy at energy consuming device.

3. The energy management and monitoring system of claim 1 wherein said second interface comprises a telephone line interface and said controller communicates with said server via a telephone connection.

4. The energy management and monitoring system of claim 3 wherein said second interface comprises a temporary connection which is periodically established over said telephone line between said controller and said server and information is collected from said plurality of remote devices and transmitted to said server via said temporary connection.

5. The energy management and monitoring system of claim 1 wherein said first interface of at least one wireless remote device of said plurality of wireless remote devices is configured to monitor a temperature sensor.

6. The energy management and monitoring system of claim 1 wherein said first interface of at least one wireless remote device of said plurality of wireless remote devices is configured to count pulses from a meter.

7. The energy management and monitoring system of claim 1 wherein said first interface of at least one wireless remote device of said plurality of wireless remote devices is configured to drive a relay.

* * * * *

UNITED STATES PATENT AND TRADEMARK OFFICE
CERTIFICATE OF CORRECTION

| | | |
|---|---|---|
| PATENT NO. | : 6,874,691 B1 | |
| APPLICATION NO. | : 10/119647 | |
| DATED | : April 5, 2005 | |
| INVENTOR(S) | : Paul N. Hildebrand and Phillip L. Parsons | |

It is certified that error appears in the above-identified patent and that said Letters Patent is hereby corrected as shown below:

On title page, item 73 Assignee
replace "Excel Energy Technologies, Inc."
with --Excel Energy Technologies, Ltd.--.

Signed and Sealed this

Twenty-fourth Day of April, 2007

JON W. DUDAS
*Director of the United States Patent and Trademark Office*